United States Patent [19]

Graindorge et al.

[11] Patent Number: 4,536,861
[45] Date of Patent: Aug. 20, 1985

[54] OPTICAL FIBRE HYDROPHONE

[75] Inventors: Philippe Graindorge, Magny les Hameaux; Hervé Arditty, Marly le Roy, both of France

[73] Assignee: Thomson-CSF, Paris, France

[21] Appl. No.: 583,644

[22] Filed: Feb. 27, 1984

[30] Foreign Application Priority Data

Feb. 25, 1983 [FR] France ................................ 83 03130

[51] Int. Cl.³ ............................................. H04R 17/00
[52] U.S. Cl. .................................... 367/149; 356/345
[58] Field of Search ...................... 367/140, 141, 149; 356/345, 347, 348, 361; 250/227

[56] References Cited

U.S. PATENT DOCUMENTS

| | | |
|---|---|---|
| 3,903,496 | 9/1975 | Stimler . |
| 4,297,887 | 11/1981 | Bucaro .................................. 73/655 |
| 4,320,475 | 3/1982 | Leclerc et al. ........................ 367/149 |
| 4,375,680 | 3/1983 | Cahill et al. .......................... 367/149 |
| 4,446,543 | 5/1984 | McLandrich ......................... 367/149 |

FOREIGN PATENT DOCUMENTS 0079268  5/1983  European Pat. Off. .

OTHER PUBLICATIONS

Optics Letters, vol. 5, No. 11, (Nov. 1980), T. J. Hall et al., "Detector for an Optical-Fiber Acoustic Sensor Using Dynamic Holographic Interferometry," pp. 485–487.

Applied Optics, vol. 18, No. 24, (Dec. 15, 1979), B. Budiansky et al., "Pressure Sensitivity of a Clad Optical Fiber," p. 4085.

Applied Optics, vol. 19, No. 17, (Sep. 1, 1980), D. A. Jackson et al., "Elimination of Drift in a Single-Mode Optical Fiber Interferometer Using a Piezoelectrically Stretched Coil Fiber," pp. 2926–2929.

Primary Examiner—Harold J. Tudor
Attorney, Agent, or Firm—Oblon, Fisher, Spivak, McClelland & Maier

[57] ABSTRACT

The invention relates to a monomodal optical fibre hydrophone operating by elastooptical effect, which has an interferometer structure comprising a measuring arm, in which is arranged a very long monomodal optical fibre immersed in the interaction medium in which propagates the soundwave. A phase displacement is induced by an elastooptical effect on the soundwave propagating in the fibre, by a soundwave producing an acoustic pressure field in said medium. A reference arm establishes a reference optical path and the phase displacement, linked with the sound wave, is detected by interferometry between the two optical waves coming from these two arms. This two-armed interferometer is terminated by a photorefractive medium used as an interactive reflector in accordance with the four-wave interferometry principle.

15 Claims, 3 Drawing Figures

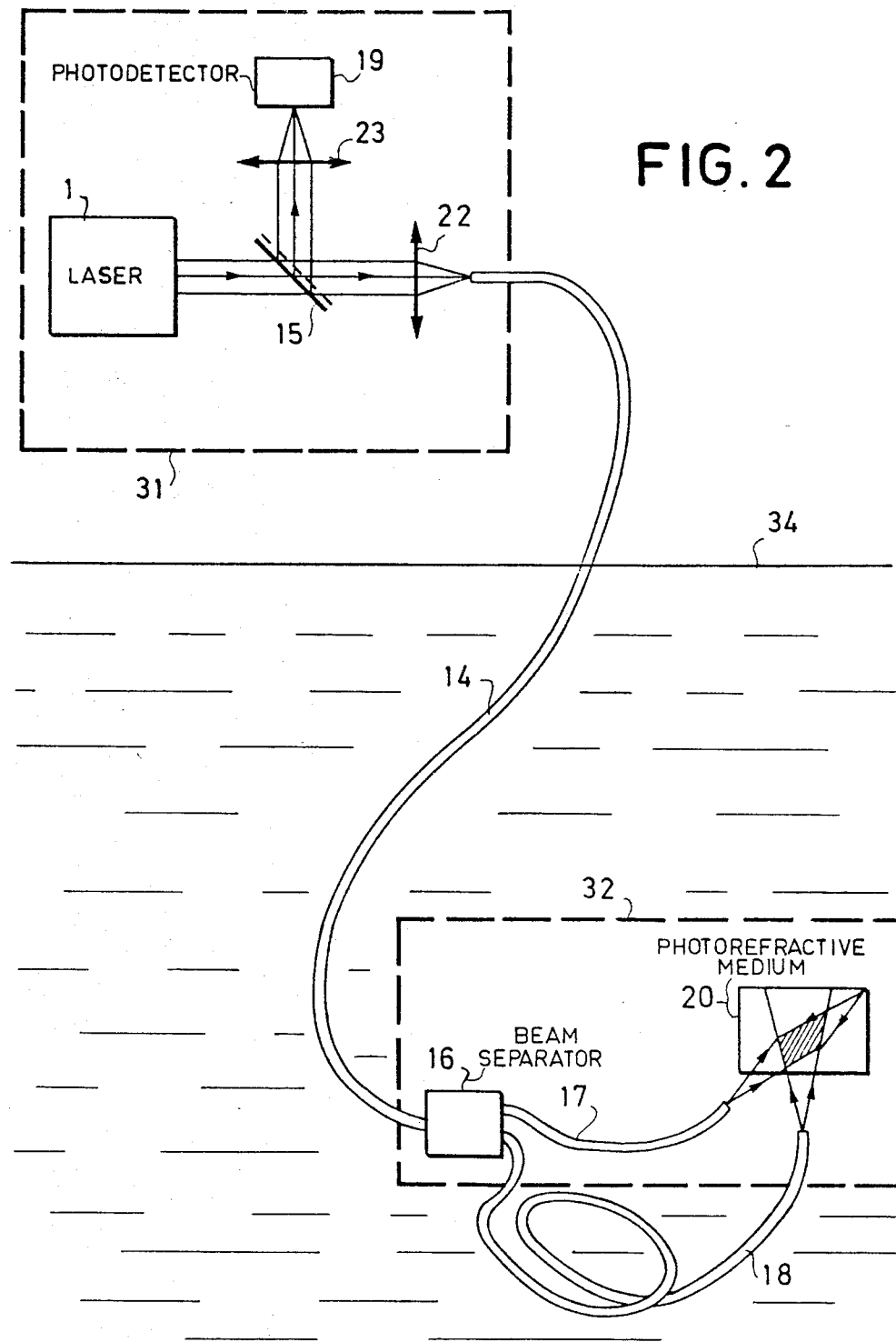

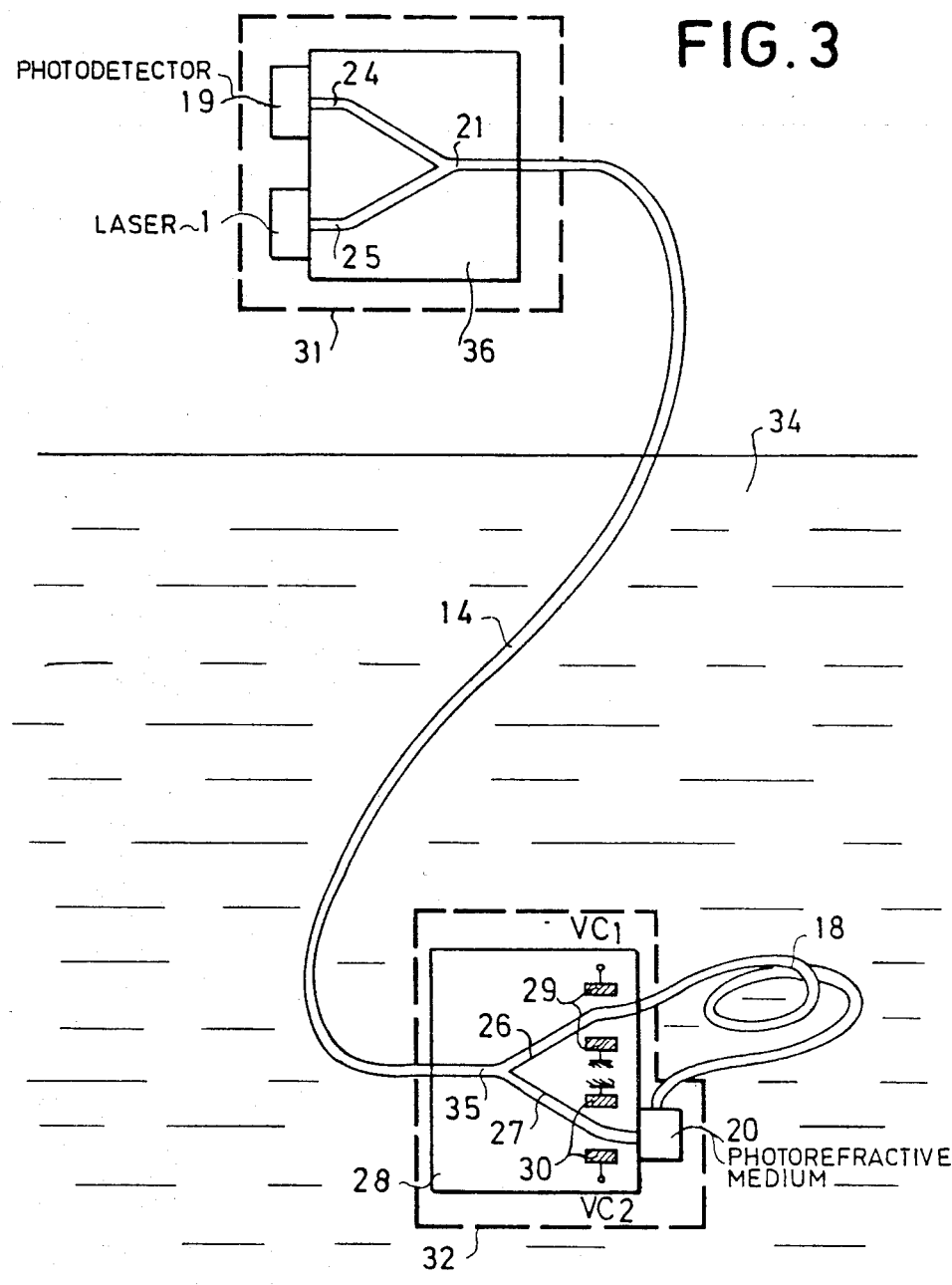

OPTICAL FIBRE HYDROPHONE

BACKGROUND OF THE INVENTION

The present invention relates to an optical fibre hydrophone. The invention relates to the field of acoustic detection in a marine medium and more particularly to a monomodal optical fibre hydrophone operating by the elastooptical effect, using interaction effects between the sound waves to be detected and a monomodal optical fibre on which said sound wave acts.

The invention relates to a hydrophone more particularly having a monomodal optical fibre which is immersed in the water, where the sound wave is propagating. The propagation of this sound wave produces pressure variations in the propagation medium and these lead to geometrical and optical parameter variations in the fibre due to the elastooptical effect. An optical wave propagating in the fibre undergoes phase variations, which can be detected by interferometry using a second monomodal optical fibre forming the reference arm. The optical connections between the optical fibre immersed in the water and which constitutes the measuring arm and the reference optical fibre are established in an optical structure forming an interferometer designed according to the Michelson interferometer principle. The Michelson interferometer generally comprises a monochromatic radiation source, an optical beam splitter such as a semitransparent plate which supplies two measuring arms terminated by mirrors and a radiation detector for collecting in superimposed manner via the optical splitter, the radiation which has performed an outward and return path along the two measuring arms. Such a device makes it possible to measure a large number of physical quantities able to affect the propagation of optical radiation along the measuring arms. Certain of these physical quantities lead to reciprocal effects producing the same transmission delay, no matter what the propagation direction of the optical radiation in each of the measuring arms. Other physical quantities cause non-reciprocal effects, which influence the transmission delay differently as a function of the propagation direction of the optical radiation. The two non-reciprocal effects which are conventionally considered are the Faraday effect and the relativistic inertial effect. The Faraday effect occurs when the measuring arm has a material medium in which a magnetic field produces a preferred electron spin orientation. The relativistic inertial effect used in a ring-type interferometer is called the Sagnac effect and the interferometer is then called a gyrometer.

The reciprocal effects are not linked with the destruction of the symmetry of the space or a material medium. They are observed when the measuring arms are the source of optical, thermal or mechanical stresses.

In addition, optical reflection systems based on the use of photorefractive media are known, which make it possible to reflect an incident wave front in the form of a conjugate wave front. An ordinary mirror reflects the light if it came from a virtual object not coinciding with the object illuminating said mirror. Conversely, a photorefractive medium can reflect a wave front having a conjugate space, which returns to the object a radiation isomorphic of that coming therefrom. In the presence of reciprocal effects, this interactive reflection ensures the insensitivity to such effects, provided that they have not varied during the outward and return path of the radiation and the photorefractive medium has been able to adapt to the variations of these effects. However, this aptitude to cancel out the reciprocal effects is not prejudicial to the interferometric measurement of the non-reciprocal effects.

U.S. Pat. No. 4,320,475 describes a first prior art device comprising a monomodal optical fibre hydrophone operating by the elastooptical effect, which has a monomodal laser source coupled to an integrated optical circuit board in which are realized means for splitting the radiation from the source towards two first integrated optical guides and means for recombining the radiation guided by two second integrated optical guides, a first monomodal fibre forming a measuring arm which is to be immersed in the interaction medium exposed to the sound wave to be detected, and a second monomodal optical fibre forming a reference arm, said two fibres having their ends respectively rigidly coupled to one of the first and one of the second optical guides the hydrophone also has an electrically controlled phase modulator acting on one of the integrated optical guides in order to introduce a phase displacement between the guided waves, means for detecting the radiation from the recombination means and a device for processing the detected signals for supplying a control signal to the phase modulator, such that the phase displacement between the two arms an independent of the sound wave to be detected is maintained close to a maximum sensitivity point. The processing device also supplies a measuring signal which is characteristic of the sound waves.

Moreover, European patent application No. 0 079 268 describes a Michelson interferometer in which the mirrors are replaced by a conjugate mirror. This interferometer is sensitive to non-reciprocal effects. This mirror is said to be "conjugate", in fact an incident divergent wave in the medium is reflected in the form of a convergent wave conjugate of the incident wave. This photorefractive mirror Michelson interferometer comprises a monochromatic radiation source, an optical beam splitting means supplying two fractions of said radiation to two measuring arms terminating by reflecting means and a photodetector, the latter being arranged so as to collect in superimposed manner said two radiation fractions having performed an outward and return travel in the two arms.

The two radiation fractions interfere within this photorefractive medium, a reflector then making it possible to reflect under normal incidence towards said medium the first radiation fraction which is passed through it. However, this second prior art device using the conjugate wave front of the first incident wave fraction reaching the photorefractive medium requires that the reflected wave is the conjugate wave of the incident wave and consequently that the medium does not deform the wave front of the incident wave.

Compared with the first prior art device, the hydrophone according to the invention constitutes a high-pass frequency filter and makes it possible to eliminate the consequences of low frequency interference. Moreover, it permits a self-alignment of the conjugate beam, which is recoupled in the fibre without requiring any alignment. It also permits a remote supply in the interaction medium, which makes it undetectable by conventional detection means, such as sonar.

SUMMARY OF THE INVENTION

The present invention therefore specifically relates to an optical fibre hydrophone comprising a system for the transmission and detection of radiation incorporating a monochromatic radiation source, means for detecting the radiation and first splitting means, said source and said detection means being connected to said splitting means, a measuring head immersed in an interaction medium subject to the sound wave to be detected and a monomodal waveguide element connecting said system to said head, the latter comprising, combined in the same case, second splitting and mixing means, a monomodal optical waveguide forming the reference arm, a photorefractive medium and a radiation reflecting means, the monomodal optical fibre forming a measuring arm being immersed in the interaction medium, the second splitting and mixing means distributing a first and second fraction of said radiation to said measuring and reference arms, the two radiation fractions intersecting in the photorefractive medium, said reflecting means making it possible to reflect the first of these two radiation fractions, the second splitting and mixing means then permitting the recombination of the radiation after the radiation has traversed the measuring and reference arms, the first splitting means permitting the detection means to detect this radiation following a passage in the connecting waveguide.

BRIEF DESCRIPTION OF THE DRAWINGS

The invention is described in greater detail hereinafter relative to non-limitative embodiments and with reference to the attached drawings, wherein show: FIG. 2 the hydrophone according to the invention. FIG. 3 a variant of the hydrophone according to the invention.

DETAILED DESCRIPTION OF THE INVENTION

Figure 1:
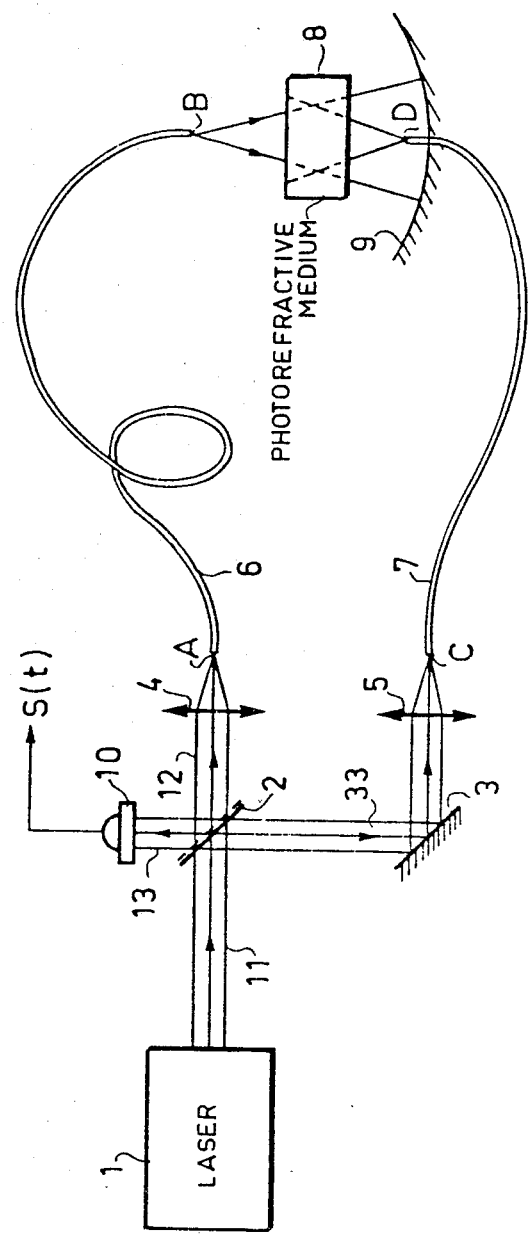
FIG. 1 a prior art Michelson interferometer.

The hydrophone according to the invention has an interferometer structure and has on one of the optical paths of the interferometer a monomodal optical fibre, which is immersed in the sound wave field to be detected and which is assumed to be uniform of pressure P and angular frequency $\omega_S$. This sound wave field induces by the elastooptical effect an index variation $\Delta n$ in the fibre index n. This index variation is translated by a phase displacement $\Delta \phi$, which is a function of the index variation $\Delta n$, of the length l of the immersed fibre and the wavelength $\lambda$ of the optical wave, so that:

$$\Delta \phi(\omega_s) = \frac{2\pi l}{\lambda} \Delta n.$$

FIG. 1 shows a prior art interferometer with two arms. In common with the conventional Michelson interferometer, this interferometer has a monochromatic radiation source 1, which emits a beam 11 in the direction of an optical splitting means 2, e.g. constituted by a semireflecting planar plate. The incident radiation 11 on said plate 2 is split into a first transmitted portion 12 and a second reflected portion 33. The transmitted portion 12 is focused by a lens 4 on to the input A of a first optical wave guide 6, which retransmits said radiation portion by its output B. The reflected portion 33 is reflected by a mirror 3 towards a lens 5, which focuses the radiation on input C of the second optical waveguide 7. End D of waveguide 7 radiates a divergent beam which meets the divergent beam radiated by end B of waveguide 6. The interference of the two radiation portions is detected by photodetector 10, which supplies a signal S(t) representing the passage of interference bands. The two measuring arms of the interferometer are then formed on the one hand by elements 4, 6 and on the other by elements 3, 5 and 7. The interferometer of FIG. 1 uses a photorefractive medium 8 and a concave spherical mirror 9 for reflecting from B to A and D to C the radiation portions which have circulated in the two measuring arms. The concave spherical mirror 9 is arranged to receive across medium 8 a spherical wave front from end B, in such a way that said wave front is reflected under normal incidence and is focused on to end B. The photorefractive medium 8 cooperates with mirror 9 and the pumping radiation from end B to return towards end D a radiation having the conjugate phase of the radiation emitted by said end D and which spontaneously converges there. Moreover, the radiation emerging from end B and traversing the photorefractive medium 8 arrives with a normal incidence at the reflecting surface of mirror 9, which reflects it towards end B after again passing through medium 8. This radiation can be considered as the pumping beam of the photorefractive medium 8.

The radiation from end D of waveguide 7 constitutes a signal beam which, within the photorefractive medium 8, interferes with the pumping beam. This interference spatially modulates the refringent properties of the photorefractive medium and a system of index lines develops, which can be considered as a dynamic hologram of the radiation structure contained in the signal beam. By receiving the pumping radiation passing through the photorefractive medium 8 after normal reflection on spherical mirror 9, the dynamic hologram diffracts towards end D of waveguide 7, a conjugate reconstruction of the radiation emerging from said end. If the radiation emerging from end D in the direction of the photorefractive medium is a progressive electromagnetic wave, the conjugate reconstitution is the associated regressive electromagnetic wave having isomorphic wave fronts with phase displacement sign change, the latter being evaluated by taking as the reference the phase reference of the pumping beam.

It is apparent from what has been stated hereinbefore, that the system of index lines of the photorefractive medium 8 behaves in the same way as a deviating mirror with respect to end D of the second measuring arm of the interferometer.

The device according to the invention uses a Michelson interferometer, but it is an optical fibre hydrophone, whose operation is based on an averging of the detected signal in the photorefractive crystal. This device is diagrammatically shown in FIG. 2 and comprises two systems, namely a radiation transmission and detection system 31 and a measuring head 32 immersed in the interaction medium 34 exposed to the sound wave.

These two systems are connected by a waveguide element 14, which can e.g. be an optical fibre. A measuring arm, incorporating an optical fibre, is connected to said measuring head, said measuring arm being immersed in the interaction medium 34 exposed to the sound wave.

More specifically, the device according to the invention can comprise a certain number of elements. There is a laser 1, whose wavelength corresponds to the spectral sensitivity region for the photoconduction of the photorefractive material 8 used. In the case of materials such as bismuth oxide—silicon (BSO), bismuth oxide—germanium (BGO) or barium titanate (BaTiO$_3$), the wavelength can be between 575 and 450 nm, making it possible to use e.g. argon and krypton lasers.

A beam splitter 15 makes it possible for photodetector 19 to detect the interference of two radiation fractions received on the return path from the measuring and reference arms 18, 17. This photodetector 19 supplies a signal representing the interference lines.

A monomodal optical guide 14 maintains the polarization and acts as a spatial filter. For example, this spatial filter can form a remote supply arm. This filter makes it possible to only retain the zero interference order, because the waveguide used is monomodal. It can therefore make it possible to remotely supply the complete interferometer. The advantage is that it permits a remote measurement of the laser source. Moreover, as the interferometer is made from dielectric materials it cannot be detected by conventional means (sonar, radar), which is not the case with the laser source. The remote supply also offers an advantage here.

A splitter 16 separates the incident beam into two radiation fractions, which are transmitted by the two measuring and reference arms 18, 17. It can be constituted by a splitting plate, or an integrated optical splitter, or a fibre coupler Such a coupler is formed e.g. from two eroded, joined fibres, the coupling being by evanescent waves.

Two arms 17, 18 are provided and one of these can be made sensitive to pressure variations by coating with an appropriate material. This coating of the measuring arm 18 is not necessary if the other arm is insensitive, i.e. for example if it is inside a case 32, as shown in FIG. 2.

For example, said coating can be produced by a large section of a very elastic material, such as rubber which, in the presence of sound waves, compresses and consequently brings about an elongation of the fibre and consequently a phase variation of the signal carried. This fibre represents the "sensor" arm of the interferometer, whilst the other is the reference arm. The reference arm must make it possible to equalize the optical paths. It is possible to greatly reduce its length, if the source has a sufficient coherence length. Thus, consideration can be given to a measuring arm of length 10 meters with a reference arm of length 1 metre, in the case of a coherence length of at least 9 meters.

A photorefractive material 8 serves as the interaction medium for the waves from the two fibres. This material must be photoconductive and electrooptical.

The photorefractive medium can be crystals of bismuth oxide—silicon (BSO), bismuth oxide—germanium (BGO) as well as barium titanate (BaTiO$_3$), potassium niobate (KNbO$_3$), strontium and barium niobate (SBN) and potassium tantalate niobate (KTN), which can be pure or doped in order to be sensitive to the higher wavelengths (above 0.8 um).

A photorefractive medium is a photoexcitable medium in which the incident photons produce charge carriers, which can diffuse within the material when the illumination has dark areas alternating with bright areas. This medium is also electrooptical, which makes it possible to observe refractive index variations produced by the internal electric field, which itself results from the migration of the charge carriers. On the basis of these properties, it is possible to optically condition a photorefractive medium by bringing about interference there of a signal beam or object beam and a pumping beam. The system of bands generates index lines which, by diffracting the pumping beam, can produce a conjugate signal beam. This is produced in accordance with the four-wave interferometry method, when the pumping beam which has traversed the medium is reflected back towards it by a mirror ensuring the reverse return.

There can optically be a crystal or polaroid polarizer placed between the measuring and reference arms and the photorefractive medium. Thus, conjugate mirror only functions in a polarization whose direction is parallel to the crystal axis C. Thus, a polarizer is necessary on using a multimodal fibre, or if said fibre is monomodal, but does not retain the rectilinear polarization. This interferometer is constituted by four waves, each having a different function. Each of the arms of the interferometer carries two waves, the "writing reference" wave or pumping wave and the "rereading" wave respectively on the outward or return paths of the reference arm; the "object wave" or signal wave and the "conjugate" wave respectively on the outward and return paths of the measuring arm.

The reference and object waves produce a phase network in the photorefractive material. The network is reread by the reflected "reference" wave, which then becomes the "rereading" wave. This rereading produces the wave which is spatially conjugate of the object wave which, after recoupling in the "sensor" fibre interferes, at the interferometer output, with the "rereading" wave, which is itself recoupled in the "reference" fibre.

When the optical length of one of the two arms is in a reciprocal manner, the phase difference introduced modifies the network inscribed in the "conjugate mirror", but the interference pattern at the interferometer output is not modified.

The device according to the invention takes account of the time necessary for the modification of the inscribed network for using the interferometer with time-variable phase signals. The reference arm supplies the writing reference wave and the rereading wave. The object beam is also directed on the crystal, so as to interfere with the writing reference beam. The rereading wave can be obtained by reflection on a spherical mirror permitting the reflection under a normal incidence towards the photorefractive medium of the radiation fraction which has passed through it.

It can also be obtained by using an external oscillator, which has a phase conjugation device operating without external pumping and with fourwave mixing in a photorefractive crystal, e.g. of barium titanate. This external oscillator is an oscillating optical cavity centred on the phase conjugation device, so as to bring about the conjugation of the pumping or pump beam without any external energy source. The conjugate of the pumping beam forms the rereading beam. This device has two aligned mirrors for forming a resonant cavity and permits a 10% reflectivity of an incident wave with Gaussian distribution.

It can also be obtained by using degenerated "four-mode mixing" using the photorefractive effect in e.g. a barium titanate crystal. The angle of the crystal can form with the autoinduced network created by the spatial nonuniformity of the pumping beam located in said crystal, an oscillating optical cavity in the manner described hereinbefore. This auto-induced network differs from the network resulting from the interference in said crystal of the pumping and object beams. The second pumping beam normally required for a fourwave mixing is derived from the actual incident wave in the crystal by "four-wave mixing" coupling with the auto-indiced oscillating cavity in the crystal. It is a device of this type which is considered in FIG. 2.

The angle of incidence of the object beam is such that the latter cannot conjugate on the crystal angle, as is the case with the reference beam.

The rereading beam rereads the hologram formed between the reference beam and the object beam in order to give the conjugate beam. This photorefractive medium 20 makes it possible to "reflect" towards the beam spliter 16 the radiation fractions which have circulated in the measuring and reference arms outward and return directions after interference in said same medium 20.

The photorefractive medium 20 cooperates with the pumping radiation from the end of the reference arm in order to return towards the end of the measuring arm a radiation having the conjugate phase of the radiation emitted by said end and which converges spontaneously. On the basis of the properties of such a photorefractive medium 20, it can consequently be optically conditioned by bringing about interference thereon of a signal beam and a pumping beam. The system of bands produces index lines which, by diffracting the pumping beam, can produce a conjugate signal beam. This is produced in accordance with the four-wave interferometry method, when the pumping beam which has traversed the medium is returned towards the latter by reflection on an angle of the crystal, thus permitting the inverse return of said beam.

The radiation from the end of the measuring arm 18 thus constitutes a signal beam which, within the photorefractive medium 20, interferes with the pumping beam. This interference spatially modulates the refringent properties of the photorefractive medium and there is a development there of a system of index lines which can be considered as a dynamic hologram of the radiation structure contained in the signal beam. By receiving the pumping radiation which passes through the photorefractive medium 20 after reflection on the angle of the crystal, the dynamic hologram diffracts towards the end of measuring arm 18 a conjugate reconstitution of the radiation emerging from said end. If the radiation emerging from said end in the direction of the photorefractive medium is a progressive electromagnetic wave, the conjugate reconstitution is the associated regressive electromagnetic wave having isomorphic wave fronts with change of sign of the phase displacement, the latter being evaluated by taking as the reference the phase reference of the pumping beam.

Thus, the system of bands of the photorefractive medium behaves like a deviating mirror with respect to the end of the measuring arm. This reflecting function imposes no particular condition on the signal beam, because the reflection of the pumping radiation by the angle of crystal 20 retains the shape of the wave fronts. Thus, a monomodal wave guide 17 will be chosen and the radiation source 1 must supply a radiation of appropriate coherent length. For example, source 1 is a helium-neon laser, an argon laser, or a monomodal semiconductor laser, as a function of the sensitivity wavelength of the crystal.

The measurement takes place in the following way. If a variable phase disturbance is applied to one of the arms, the hologram formed contains the mean phase information for the disturbed beam, i.e. the direct current, very low frequency component. The alternating current component is assumed to be very fast compared with the cutoff frequency of holographic recording in the crystal in order to be recorded.

The phase of the conjugate beam is therefore equal and reverse to the mean value of the disturbance. On again passing through the same, the beam again undergoes a phase displacement due to the disturbance and only the alternating current component is detected at the output.

Thus, the phase of the conjugate beam at the output is equal to:

$$(-\phi_o) + (\phi_o + \phi_1 \sin \omega t) = \phi_1 \sin \omega t.$$

($\phi_o$ continuously applied phase displacement, $\phi_1$ periodic phase displacement).

In the case where the disturbance is applied to the reference arm, it is possible to use the following equation:

| | |
|---|---|
| giving | $\phi_{conj} = \phi_{reread} + \phi_{hologram}$ |
| | $\phi_{reread} = \phi_o + \phi_1 \sin \omega t$ |
| | $\phi_{hologram} = \phi_o$ |
| | $\phi_{object} = 0$ |
| so that | $\phi_{conj} = 2\phi_o + \phi_1 \sin \omega t$ |
| and at the output | $\phi_{reread} = 2\phi_o + 2\phi_1 \sin \omega t$ |

Here again, the phase displacement between the two beams at the output is $\phi_1 \sin \omega t$. Thus, the result is a measurement of the component of the signal having a frequency higher than the cutoff frequency of the signal (which can vary between 1 ns and a few hours, as a function of the conditions) with elimination of the lower frequency component and in particular the direct current component. The stability of the direct current component makes it possible to obviate any zero corrective control, as is conventionally required in such devices.

Thus, $\Delta\phi$ is the phase difference between two waves from the measuring and reference arms after passing through the same and in the absence of "non-reciprocal" disturbance $\Delta\phi$ equals 0.

The sensitivity of the interferometer is very low, if the phase difference $\Delta\phi$ differs only slightly from zero. This is the case if it is wished to measure small acoustic signals.

In order to increase the sensitivity of the interferometer, it is possible to introduce a constant "non-reciprocal" bias into the phase of the two waves circulating in reverse directions, so as to displace the interferometer operating point.

In the case of a function varying according to a cosinusoidal function, the highest sensitivity point is obtained by the angles of $(2K+1)\pi/2$ with K being an integer. It is therefore possible to choose a bias introducing a phase variation on each wave. Thus, a phase modulator can be introduced on the passage of the waves. Thus, a phase modulation system can be used for improving the response of the system. To bring about this modulation, consideration can e.g. be given to an integrated optical modulator, which can have two electrodes arranged on either side of a waveguide on the surface of an electrooptical substrate. However, it can also be a hollow piezoelectric material cylinder to which is adhered the fibre constituting the measuring arm. This cylinder when excited by a signal expands and contracts and consequently brings about an elongation of the fibre, which leads to a phase variation in the carried signal. However, the periodic variation to be measured must be slower than the modulation speed. In order to extract it, it is merely necessary to carry out a synchronous demodulation or a heterodyning.

The phase modulating device or devices can in each case be subdivided into two identical parts located symmetrically at the two ends of the optical path in the measuring and reference arms and excited in opposition. This arrangement ensures a supplementary symmetrization of the phenomena, which reduces errors of the second order resulting from possible non-linearities of the modulators. The excursion of this modulation must be relatively small in order not to interfere with the holographic network. Thus the network recorded is the mean of the illumination at each point S.

In the crystal, the phase displacement is $\phi = (\phi_1 \sin \omega t + Kz)$ (K being the wave vector of the illumination network and z the position in the crystal in a direction perpendicular to the illumination lines), the mean illumination at one point being proportional to:

$$I(z) = \frac{1}{2\pi} \int_0^{\frac{2\pi}{\omega}} \sin^2(\phi_1 \sin \omega t + Kz) dt = \frac{1}{2} + J_0(2\phi_1)\cos 2Kz$$

In order to retain the spatial variation, i.e. the term $\cos 2 Kz$, it is therefore necessary for the value $J_o(2\phi_1)$ to remain as large as possible and consequently for the modulation depth $\phi_1$ to be relatively small (i.e. $\phi_1 \leq 0.5$ rd for $J_1(2\phi_1) \geq 0.8$). The frequency f of this modulation must be well above the maximum frequency of the signal to be detected in order that the recovery of the signal takes place by heterodyning at 2f. Thus, it can be a sinusoidal modulation or a square-wave signal.

The device shown in FIG. 3 is a variant of the device according to the invention realized in integrated optics. It comprises once again a radiation transmission and detection system formed by source 1 and detector 19, as well as splitting and mixing means realized by integrated optical guides having a Y-shaped configuration 24, 25, 21. The spatial filter is realized by optical fibre 24. The measuring head comprises wave guides which have a Y-shaped configuration 35, 26, 27.

The interactive medium is shown at 20. The reference arm is constituted by waveguide 27 and the measuring arm by fibre 18.

The waveguides are produced by integration in a substrate, which can be chosen from among the following materials: lithium niobate or lithium tantalate in which respectively titanium or niobium is diffused in order to form the waveguides. The substrate can be chosen from gallium arsenide in which the waveguides are realized by ion or proton implantation, or barium titanate in which the guides are produced by the previously described method or by region reversal. The modulator is broken down into two modulators 29 and 30, placed at the two ends of the fibre. More specifically the modulators used in the invention can utilize various electrooptical effects, such as the Pockels effect, the Kerr effect, etc.

These two couplers, realized by optical radiation splitters formed by monomodal waveguides interconnected in order to form a Y-like configuration, are interconnected by one of their branches as well as by the optical fibre 14 serve the function performed in FIG. 2 by the semitransparent plates. In this case the second Y can then be realized in the photorefractive medium and then use is made of the retroreflection of the waves obtained by a coupling with an angle of said medium as described hereinbefore.

We claim:

1. An optical fibre hydrophone for detecting sound waves in a medium, comprising:
   means for transmitting and detecting radiation;
   a measuring head immersed in said medium; and
   a monomodal waveguide element connecting said measuring head and said means for transmitting and detecting radiation;
   said means for transmitting and detecting radiation including a monochromatic radiation source, means for detecting radiation and a first splitting means, said source and said means for detecting each being connected to said splitting means, said means for transmitting and detecting radiation introducing radiation into said waveguide element;
   said measuring head including a second splitting means, a monomodal optical waveguide element forming a reference arm, a photorefractive medium and a monomodal optical fibre forming a measuring arm, said measuring arm being immersed in said medium so as to contact said sound waves, while said reference arm, photorefractive medium and splitting means are protected from said medium and not in contact with said sound waves;
   wherein said splitting means distributes a first and second fraction of said radiation to said measuring arm and said reference arm respectively, said second fraction being directed from said reference arm to a crystal angle of said photorefractive medium and said first fraction being directed from said measuring arm in a different direction from said crystal angle, so as to intersect in said photorefractive medium and reenter said measuring arm and said reference arm;
   said second splitting means then recombining the radiation from said measuring arm and said reference arm, said radiation traveling through said waveguide element to said means for transmitting and distributing radiation, said first splitting means directing said radiation to said detecting means.

2. A hydrophone according to claim 1, wherein the measuring arm has a fibre enveloped by a rubber sheath.

3. A hydrophone according to claim 1, wherein the photorefractive medium is of barium titanate.

4. A hydrophone according to claim 3, wherein the monochromatic radiation source is an argon laser of wavelength exceeding 0.55 micrometers.

5. A hydrophone according to claim 1, wherein the photorefractive medium is of barium and strontium niobate.

6. A hydrophone according to claim 1, wherein the photorefractive medium is of potassium tantalate niobate.

7. A hydrophone according to claim 1, wherein the photorefractive medium is of bismuth oxide—silicon.

8. A hydrophone according to claim 1, wherein the photorefractive medium is of bismuth oxide -germanium.

9. A hydrophone according to claim 1, wherein said monomodal wave guide element is a remote supply arm.

10. A hydrophone according to claim 1, further comprises phase modulation means arranged on the path of the radiation in at least one of the measuring and reference arms.

11. A hydrophone according to claim 10, wherein said phase modulation means are formed of integrated optics.

12. A hydrophone according to claim 1, wherein said first and second splitting means are entirely formed of a solid medium by integration on a substrate, said splitting means being formed as-y-shaped waveguides interconnected by one of their branches and by the connecting waveguide, the two other ends of the first Y being respectively connected to the source and to the detection means, while the two other ends of the second Y are respectively connected to the first end of an optical fibre forming the measuring arm and to the photorefractive medium, the second end of the measuring arm being connected to said photorefractive medium.

13. A hydrophone according to claim 12, wherein at least one pair of electrodes is arranged on either side of at least one of said two other ends of the second Y to form an electrooptical effect phase modulator, said electrodes receiving a control signal.

14. A device according to claim 12, wherein the substrate is chosen from among the following materials: lithium niobate, or lithium tantalate in which is diffused titanium or niobium for forming the waveguides.

15. A device according to claim 12, wherein the substrate is made of gallium arsenide, in which the waveguides are formed by ion or proton implantation.

* * * * *